United States Patent
Guan et al.

(10) Patent No.: US 9,800,523 B2
(45) Date of Patent: Oct. 24, 2017

(54) SCHEDULING METHOD FOR VIRTUAL PROCESSORS BASED ON THE AFFINITY OF NUMA HIGH-PERFORMANCE NETWORK BUFFER RESOURCES

(71) Applicant: SHANGHAI JIAO TONG UNIVERSITY, Shanghai (CN)

(72) Inventors: Haibing Guan, Shanghai (CN); Ruhui Ma, Shanghai (CN); Jian Li, Shanghai (CN); Xiaolong Jia, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 14/412,363

(22) PCT Filed: Aug. 22, 2014

(86) PCT No.: PCT/CN2014/084982
§ 371 (c)(1),
(2) Date: Dec. 31, 2014

(87) PCT Pub. No.: WO2016/026131
PCT Pub. Date: Feb. 25, 2016

(65) Prior Publication Data
US 2016/0062802 A1   Mar. 3, 2016

(51) Int. Cl.
*G06F 13/00* (2006.01)
*H04L 12/861* (2013.01)
(Continued)

(52) U.S. Cl.
CPC ........ *H04L 49/9068* (2013.01); *G06F 9/4881* (2013.01); *G06F 9/4555* (2013.01);
(Continued)

(58) Field of Classification Search
CPC ...................................................... G06F 9/455
See application file for complete search history.

(56) References Cited

U.S. PATENT DOCUMENTS

| 2010/0250868 A1 | 9/2010 | Oshins |
| 2011/0296406 A1 | 12/2011 | Bhandari |

(Continued)

FOREIGN PATENT DOCUMENTS

| CN | 102289390 | 12/2011 |
| CN | 102591715 | 7/2012 |

(Continued)

OTHER PUBLICATIONS

Haiquan Li, Haibing Guan.Increase Trace Cache Storage Efficiency,Computer Applications and Software,2007,24 (6):84-86 2007.

*Primary Examiner* — Adam M Queler
*Assistant Examiner* — Edmund Kwong
(74) *Attorney, Agent, or Firm* — Marsh Fischmann & Breyfogle LLP; Jonathon A. Szumny

(57) ABSTRACT

A scheduling method for virtual processors based on the affinity of NUMA high-performance network buffer resources, including: in a NUMA architecture, when a network interface card (NIC) of a virtual machine is started, getting distribution of the buffer of the NIC on each NUMA node; getting affinities of each NUMA node for the buffer of the network interface card on the basis of an affinity relationship between each NUMA node; determining a target NUMA node in combination with the distribution of the buffer of the NIC on each NUMA node and NUMA node affinities for the buffer of the NIC; scheduling the virtual processor to the CPU on the target NUMA node. The problem of affinity between the VCPU of the virtual machine and the buffer of the NIC not being optimal in the NUMA architecture is solved to reduce the speed of VCPU processing network packets.

4 Claims, 3 Drawing Sheets

(51) Int. Cl.
*G06F 9/48* (2006.01)
*G06F 9/455* (2006.01)
*G06F 9/50* (2006.01)

(52) U.S. Cl.
CPC .... *G06F 9/5083* (2013.01); *G06F 2009/4557* (2013.01); *G06F 2009/45579* (2013.01); *G06F 2009/45595* (2013.01); *G06F 2212/2542* (2013.01)

(56) References Cited

U.S. PATENT DOCUMENTS

| | | | | |
|---|---|---|---|---|
| 2013/0268933 | A1* | 10/2013 | Bhandari | G06F 9/5044 718/1 |
| 2014/0173600 | A1* | 6/2014 | Ramakrishnan Nair | G06F 9/461 718/1 |
| 2015/0334058 | A1* | 11/2015 | Tsirkin | H04L 49/9005 370/471 |

FOREIGN PATENT DOCUMENTS

| | | |
|---|---|---|
| CN | 103995733 | 8/2014 |
| CN | 104199718 | 12/2014 |

\* cited by examiner

SCHEDULING METHOD FOR VIRTUAL PROCESSORS BASED ON THE AFFINITY OF NUMA HIGH-PERFORMANCE NETWORK BUFFER RESOURCES

FIELD OF THE INVENTION

The present invention relates to the field of the computer system virtualization, and more particularly to a scheduling method for virtual processors based on the affinity of NUMA high-performance network buffer resources.

DESCRIPTION OF THE PRIOR ART

Virtualization technology usually integrates the functions of calculation or storage achieved by multiple physical devices into one physical server with relatively greater functionality, thereby achieving the integration and reallocation of hardware resources, improving the utilization ratio of hardware devices, and playing a very important role in building the cloud computing and data centers.

A virtual machine monitor refers to a software management layer between the hardware and traditional operating system, and the main function thereof is to manage real physical devices, such as a physical central processing unit (CPU), memory, etc., and to abstract the underlying hardware to the corresponding virtual device interface, which enables multiple operating systems to get the required virtual hardware respectively, so that they can run simultaneously on the same physical device.

The feature of NUMA (Non Uniform Memory Access Architecture) is that the shared memories are distributed physically, and the collection of all these memories is global address space. Therefore, the time that the processors spend in accessing these memories is different; apparently the speed of accessing the local memories (high affinity) is a little more than that of accessing global shared memories or remotely accessing other memories (low affinity). FIG. 1 illustrates a schematic diagram of Non Uniform Memory Access (NUMA) architecture in the physical platform. Referring to FIG. 1, the schematic diagram is a schematic diagram of a NUMA architecture server with eight NUMA nodes. Since the distances between the processors located at different positions and each memory are different, and the distances between each processor are also different, the time that the different processors spend in accessing each memory is also different.

SR-IOV (Single-Root I/O Virtualization) technology is a virtualization solution based on hardware, which can improve performance and scalability. The SR-IOV standard allows PCIe (Peripheral Component Interconnect Express) devices to be shared efficiently between virtual machines, which is implemented in hardware, so as to be able to obtain the I/O performance comparable to the native performance.

SR-IOV is divided into Physical Function (PF) and Virtual Function (VF), wherein PF is a full-function PCIe function, which can implement discovery, management and processing as any other PCIe devices. PF has fully configured resources used to configure or control PCIe devices. VF is a lightweight PCIe function, which can share one or more physical resources with Physical Function and other VF associated with the same Physical Function. VF is only allowed to have the configured resources used for its own behavior.

FIG. 2 illustrates a schematic diagram of the operation of the network interface card with the SR-IOV function. Referring to FIG. 2, Physical Function (PF) of SR-IOV network interface card can virtualize multiple Virtual Functions (VFs), and then allocate Virtual Functions (VFs) to virtual machines. When virtual machines start, packets are sent to the corresponding receiving buffer/transmitting buffer (Rx/Tx). Virtual machines can directly access to the buffers of their own network interface cards through the support that hardware, such as IOMMU (input/output memory management unit) and the like, assists virtualization, so as to achieve the network processing speed close to the native performance.

Virtual machine monitors are introduced as a middle layer between physical devices and virtual machines, inevitably causing some effects on the performance of virtual machines, one of which is the effect on virtual machine memory. In fully virtualized environment, virtual machines with SR-IOV virtual function make virtual machines get the physical address of the buffer without the intervention of Virtual machine monitor, by means of the support of hardware, such as IOMMU and the like, which improves network performance significantly. However, in the NUMA environment, the buffer of the network interface card of the virtual machine is allocated to multiple nodes in most cases, thereby causing uncertainty of the buffer distribution, which certainly affects the speed of virtual machines processing network packets.

The existing research in academia is focused on non-virtualized aspect, which mainly takes into account that the memory distribution of tasks in NUMA is controlled by means of some libraries similar to NUMACTL and the like in NUMA, thereby making CPU and memory which process the corresponding tasks get better affinity, and improving the speed of processing tasks.

The existing Xen kernel provides several configuration methods for NUMA, wherein including that the memory is fully localized (NUMA aware placement), and the memory is configured to several nodes, then the virtual processor (VCPU) is scheduled to the allocated nodes (NUMA aware scheduling), however, which does not fully analyze the memory resources of virtual machines from the perspective of the distribution of the memory, so that the affinity between VCPU and memory does not achieve optimal effect, which inevitably affects the speed of VCPU processing the memory.

Therefore, those skilled in the art devote to developing a scheduling method for virtual processors based on the affinity of NUMA high-performance network buffer resources, so as to solve the problem that the speed of VCPU processing network packets is not optimal.

SUMMARY OF THE INVENTION

In view of the above disadvantages in the prior art, the technical problem to be solved by the present invention is that the affinity between the VCPU of the virtual machine and the buffer of the network interface card (NIC) is not optimal in the NUMA architecture, so that the speed at which the network interface card of the virtual machine processes network packets is not high.

In order to realize the above objects, the present invention provides a scheduling method for virtual processors based on the affinity of NUMA high-performance network buffer resources, including the following steps:

(1) in a NUMA architecture, when a network interface card of a virtual machine is started, getting the distribution of the buffer of the network interface card on each NUMA node;

(2) getting affinities of each NUMA node for the buffer of the network interface card on the basis of an affinity relationship between each NUMA node;
(3) determining a target NUMA node in combination with the distribution of the buffer of the network interface card on each NUMA node and affinities of each NUMA node for the buffer of the network interface card;
(4) scheduling the virtual processor to a CPU on the target NUMA node.

Further, in the step (3), CPU load balance on each NUMA node is further combined to determine the target NUMA node.

Further, in the step (1), getting the distribution of the buffer of the network interface card on each NUMA node includes the following steps:
(11) when a driver of a virtual function of the virtual machine is started, detecting a virtual address on which Direct Memory Access allocates the buffer in the driver, as well as getting the size of the buffer of the virtual function;
(12) sending the virtual address to a specified domain;
(13) the specified domain making a request to a virtual machine monitor for getting a physical address corresponding to the virtual address by a hypercall;
(14) determining the distribution of the buffer of the network interface card on each NUMA node on the basis of the analysis of the distribution of the buffer on the NUMA node corresponding to the physical address.

Further, in the step (11), the size of the buffer of the virtual function is gotten by a network interface card performance testing tool.

Further, the specified domain is Domain0 in the virtual machine monitor.

Further, in the step (2), getting affinities of each NUMA node for the buffer of the network interface card on the basis of an affinity relationship between each NUMA node includes the following step:
(21) getting the affinities of each NUMA node for the buffer of the network interface card according to information of distances between each NUMA node.

Further, the scheduling method also includes the following step after the step (4) is executed:
(5) continuing to monitor running condition of the network interface card of the virtual machine.

Further, the virtual machine has a SR-IOV virtual function.

Compared with the prior art, the present technical solutions include at least the following beneficial technical results:

According to the scheduling method for virtual processors provided by the present invention, it is by getting distribution of the buffer of the network interface card on each NUMA node and affinities of each NUMA node for the buffer of the network interface card, to determine an optimal scheduling method for virtual processors (which is determining target NUMA node), which makes the virtual processor run up to the status that the affinity between the virtual processor and the buffer of the network interface card is optimal, so as to improve the processing speed of virtual network packets.

Further, it is on the basis of the analysis of the buffer of the network interface card of the current virtual machine, to ensure an optimal affinity between the virtual processor and the target memory, so that the virtual machine more fully utilizes the features of the NUMA architecture.

Further, during the course of determining the target NUMA node, CPU load balance on each NUMA node is also taken into consideration, so as to schedule VCPUs to multiple CPU cores, which still retains the original load scheduling method, on the target NUMA node, and reduces the effect on the system.

Further, the precise configuration of VCPU resources on the Xen platform is controlled effectively, thereby ensuring that the VCPU has the optimal network processing speed for network interface card packets of the virtual machine with the SR-IOV virtual function.

Below in conjunction with the accompanying drawings, the ideas, structures and technical results of the present invention will be further described so as to fully understand the objective, characteristics and effects of the present invention.

DETAILED DESCRIPTION OF THE PREFERRED EMBODIMENTS

Below in conjunction with the accompanying drawings, the embodiment of the present invention will be further described. The embodiment is implemented on the premise of the technical solution of the present invention, and provides detail implementation and specific operation, but the scope of the present invention is not limited to the following embodiment.

Figure 1:
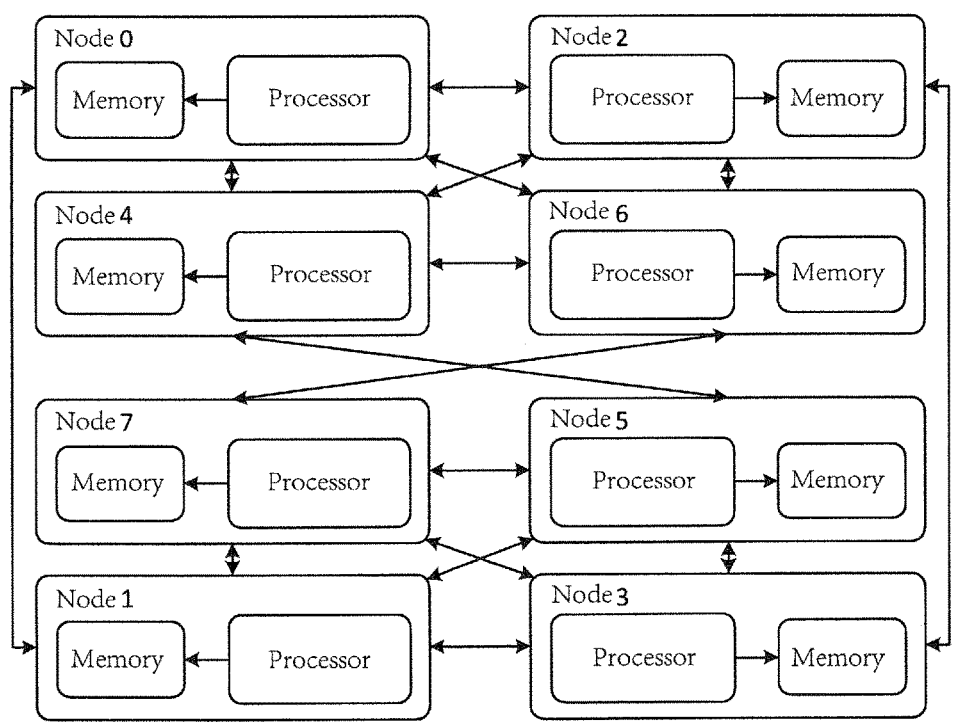
FIG. 1 is a schematic diagram of Non-Uniform Memory Access (NUMA) architecture in the physical platform.
Figure 2:
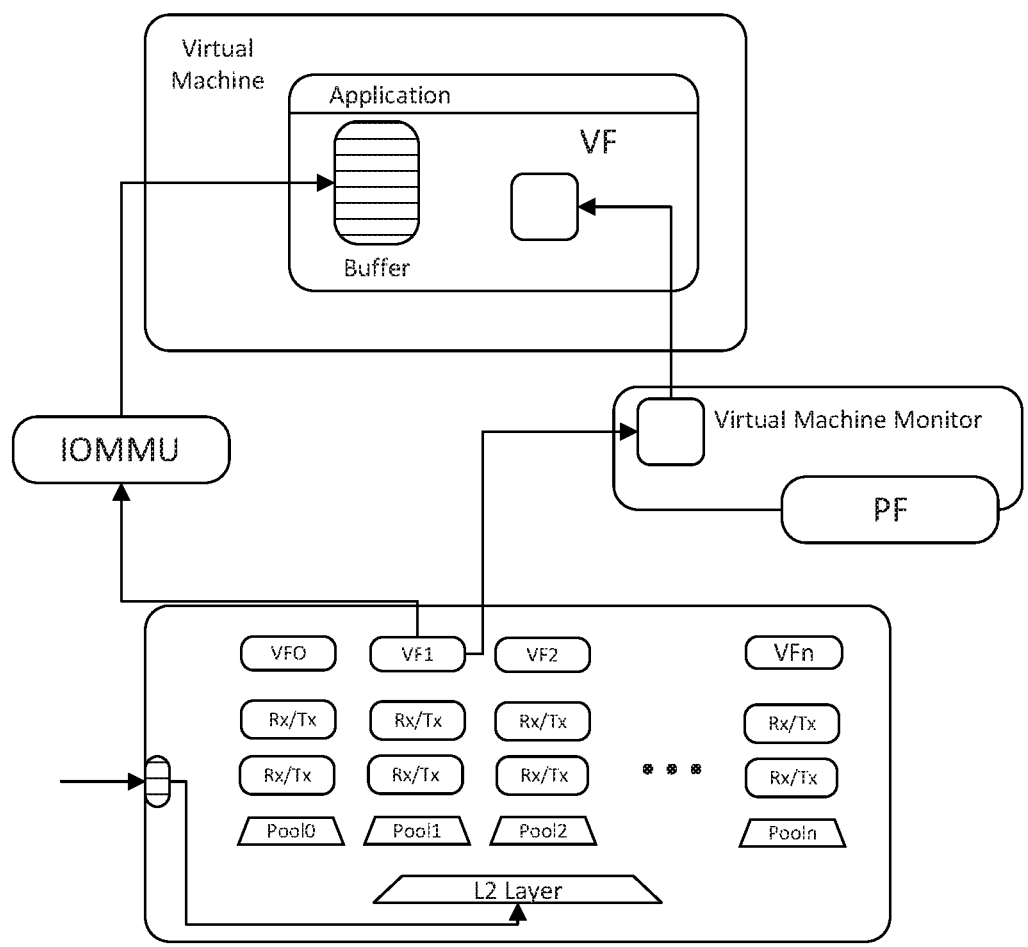
FIG. 2 is a schematic diagram of the operation of the network interface card with the SR-IOV function.
Figure 3:
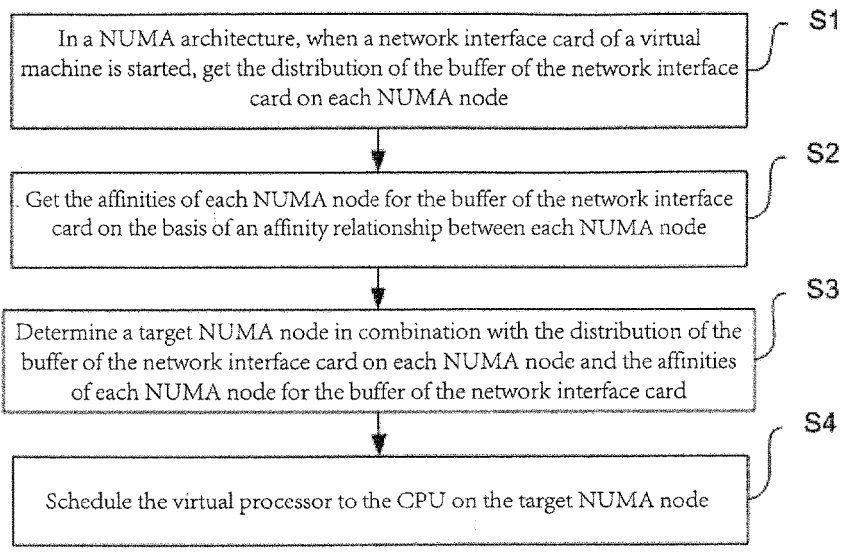
FIG. 3 is a flow diagram of a scheduling method for virtual processors based on the affinity of NUMA high-performance network buffer resources of the present invention.
Figure 4:
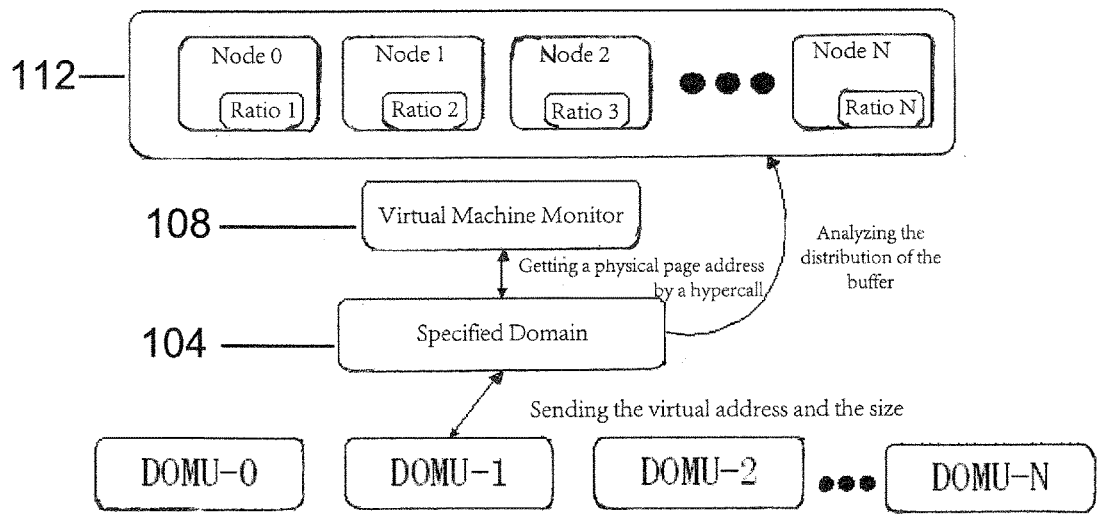
FIG. 4 is a schematic diagram of getting distribution of the buffer of the network interface card on each NUMA node, in the scheduling method for virtual processors in FIG. 3.

FIG. 3 illustrates a flow diagram of a scheduling method for virtual processors based on the affinity of NUMA high-performance network buffer resources of the present invention. Referring to FIG. 3, the scheduling method includes the following steps:
Step S1: in a NUMA architecture, when a network interface card of a virtual machine is started, getting the distribution of the buffer of the network interface card on each NUMA node;
Step S2: getting affinities of each NUMA node for the buffer of the network interface card on the basis of an affinity relationship between each NUMA node;
Step S3: determining a target NUMA node in combination with the distribution of the buffer of the network interface card on each NUMA node and affinities of each NUMA node for the buffer of the network interface card;
Step S4: scheduling the virtual processor to a CPU on the target NUMA node.

It is noted that the scheduling method for virtual processors provided by the embodiment of the present invention is applied to the virtual machine with the SR-IOV virtual function. In the NUMA architecture, the buffer of the network interface card of the virtual machine is distributed to multiple NUMA nodes, thereby causing uncertainty of the buffer distribution, which affects the speed of virtual machines processing network packets.

Specifically, in the present embodiment, whenever the virtual machine with the SR-IOV virtual function is started and enables the buffer of the network interface card, the buffer is used to receive network packets. When a driver of a virtual function of the virtual machine is started, a virtual address on which Direct Memory Access (DMA) allocates the buffer in the driver is detected, and the size of the buffer of the virtual function is gotten by a network interface card performance testing tool (such as Ethtool), and the virtual address is sent to a specified domain 104, wherein the specified domain 104 is Domain0 in the virtual machine monitor (such as Xen).

Then, the specified domain 104 makes a request to a virtual machine monitor (VMM) 108 for getting a physical address corresponding to the virtual address by a hypercall, and the distribution of the buffer of the network interface card on each NUMA node 112 is determined on the basis of the analysis of the distribution of the buffer on the NUMA node 112 corresponding to the physical address.

The core codes used to determine the distribution of the buffer of the network interface card on each NUMA node 112 are as follows:

Add the following variables to store virtual machine parameters of the calling interface.

```
struct p2m_domain *myp2m[10];
p2m_type_t *myt[10];
p2m_access_t *mya[10];
p2m_query_t myq[10];
unsigned int *mypo[10];
int count = 0;
```

Get information of the parameters by adding detecting codes to the following initialization call.

```
mfn_t ___get_gfn_type_access(struct p2m_domain *p2m,
unsigned long gfn,p2m_type_t *t, p2m_access_t *a, p2m_query_t q,
unsigned int *page_order, bool_t locked)
{
    int dom_count;
    ...
    for(dom_count =0; dom_count <count; dom_count ++) {
    if(p2m->domain->domain_id==
    myp2m[dom_count]->domain->domain_id)
    break;
    }
    if(dom_count == count) {
        myp2m[count] = p2m;   myt[count] = t;
        mya[count] = a;   myq[count] = q;
        mypo[count] = page_order;   count++;
    }
    ...
}
```

Get the physical page tables corresponding to the virtual page tables of the virtual machine by using the new function, unsigned long int do_print_mfn(unsigned long,int), to hypercall VMM.

```
unsigned long int do_print_mfn(unsigned long gfn, int domid)
{
    int i;
    mfn_t mfn;
    for(i=0; i<count; i++)
        if(myp2m[i]->domain->domain_id == domid) break;
    if(i==count){
        printk("Not found %d\n",count);
        return 0;
    }
```

-continued

```
    mfn = myp2m[i]->get_entry(myp2m[i], gfn, myt[i], mya[i],
myq[i], mypo[i]);
    return mfn;
}
```

Then, get affinities of each NUMA node 112 for the buffer of the network interface card on the basis of affinities between each NUMA node 112.

Specifically, in the NUMA architecture, affinities of each NUMA node 112 for the buffer of the network interface card are determined according to information of distances between each NUMA node 112, namely, the closer the distance between two NUMA nodes 112 is, the higher the affinity between them is. Therefore, in the present embodiment, the information of distances between each NUMA node 112 can be used to determine the affinities of each NUMA node 112 for the buffer of the network interface card.

Then, a target NUMA node 112 is determined in combination with the distribution of the buffer of the network interface card on each NUMA node 112 and affinities of each NUMA node 112 for the buffer of the network interface card. In practice, CPU load balance on each NUMA node 112 is taken into consideration, so as to schedule VCPUs to multiple CPU cores, which still retains the original load scheduling method, on the target NUMA node 112, and reduces the effect on the system.

The core codes used to determine the target NUMA node 112 are as follows:

Add the following variables:

```
int Numa_Node_dis[Max_size+1][Max_size+1];
int Numa_Info[Max_size+1];
int Numa_Node_Affi[Max_size+1];
int main( ){
    ...
    init_Numa_dis( );
    memset(Numa_Node_Affi,0,sizeof(Numa_Node_Affi));
    for(int Numa_Node=0; Numa_Node<Max_size;
    Numa_Node++) {
        for(int Numa_Else=0; Numa_Else<Max_size;
        Numa_Else++) {
            Numa_Node_Affi[Numa_Node]+=
Numa_Info[Numa_Else]*Numa_Node_dis[Numa_Node][Numa_Else];
        }
    }
    for(int Numa_Node=0; Numa_Node<Max size;
    Numa_Node++) {
        if(Numa_Node_Affi[Numa_Node] < Affinity_Min)
            Affinity_Min = Numa_Node_Affi[Numa_Node];
    }
    for(int Numa_Node=0; Numa_Node<Max_size;
    Numa_Node++) {
        if(Numa_Node_Affi[Numa_Node] == Affinity_Min)
Opt_Affinity.push_back(Numa_Node);
    }
    ...
}
```

Here, the affinity formula can be summarized as follows:

$$Numa\_Node\_Aff[i] = \sum_{k=0}^{n} Numa\_Info[k] * Numa\_Node\_dis[i][k]$$

wherein, i represents the i-th NUMA node 112, and i starts counting from 0;

the range of k is from 0 to n, and (n+1) represents the total number of NUMA nodes 112;

NUMA_Node_Aff[i] is the affinity of the i-th NUMA node 112 for the buffer of the network interface card;
NUMA_Info[k] is the size of the buffer on the k-th node;
NUMA_Node_dis[i][k] represents the distance between the processor on the i-th node and the memory on the k-th node.

Finally, the virtual processor is scheduled to the CPU on the target NUMA node 112, wherein the CPU on the target NUMA node 112 is a single-core CPU or a multi-core CPU. Then, the system continues to monitor running condition of the network interface card of the virtual machine.

The core codes used to schedule the virtual processor to the CPU on the target NUMA node 112 are as follows:

```
string Des_Range[Max_size];
    int main(int argc, char *argv[ ]){
    ...
    freopen("Numa_Map","r",stdin);
    for(int Numa_Node=0; Numa_Node<Max_size; Numa_Node++)
        cin>>Des_Range[Numa_Node];
    freopen("Numa_Opt","r",stdin);
    int Des_Node;
    cin>>Des_Node;
    string Dom = argv[1];
    string Command = vcpu_migrate+Dom+" all
    "+Des_Range[Des_Node];
    const char* arg = Command.c_str( );
    system(arg);
    ...
}
```

In summary, the present technical solution includes at least the following beneficial technical results: it is by getting the distribution of the buffer of the network interface card on each NUMA node 112 and affinities of each NUMA node 112 for the buffer of the network interface card, to determine an optimal scheduling method for virtual processors (which is determining target NUMA node 112), which makes the virtual processor run up to the status that the affinity between the virtual processor and the buffer of the network interface card is optimal, so as to improve the processing speed of virtual network packets. Further, it is on the basis of the analysis of the buffer of the network interface card of the current virtual machine, to ensure an optimal affinity between the virtual processor and the target memory, so that the virtual machine fully utilizes the features of the NUMA architecture. Further, during the course of determining the target NUMA node 112, CPU load balance on each NUMA node 112 is also taken into consideration, so as to schedule VCPUs to multiple CPU cores, which still retains the original load scheduling method, on the target NUMA node 112, and reduces the effect on the system. Further, the precise configuration of VCPU resources on the Xen platform is controlled effectively, thereby ensuring that the VCPU has the optimal network processing speed for network interface card packets of the virtual machine with the SR-IOV virtual function.

The invention has been exemplified above with reference to specific embodiments. However, it should be understood that a multitude of modifications and varieties can be made by a common person skilled in the art based on the conception of the present invention. Therefore, any technical schemes, acquired by the person skilled in the art based on the conception of the present invention through logical analyses, deductions or limited experiments, fall within the scope of the invention as specified in the claims.

The invention claimed is:

1. A scheduling method for virtual processors based on the affinity of NUMA high-performance network buffer resources, wherein the scheduling method includes the following steps:
   (1) in a NUMA architecture, when a network interface card of a virtual machine is started, getting the distribution of the buffer of the network interface card on each NUMA node;
   (2) getting affinities of each NUMA node for the buffer of the network interface card on the basis of an affinity relationship between each NUMA node;
   (3) determining a target NUMA node in combination with the distribution of the buffer of the network interface card on each NUMA node and affinities of each NUMA node for the buffer of the network interface card, wherein a CPU load balance on each NUMA node is further combined to determine the target NUMA node;
   (4) scheduling the virtual processor to a CPU on the target NUMA node;
   (5) continuing to monitor running condition of the network interface card of the virtual machine;
   wherein in the step (1), getting the distribution of the buffer of the network interface card on each NUMA node includes the following steps:
      (11) when a driver of a virtual function of the virtual machine is started, detecting a virtual address on which Direct Memory Access allocates the buffer in the driver, as well as getting the size of the buffer of the virtual function;
      (12) sending the virtual address to a specified domain;
      (13) the specified domain making a request to a virtual machine monitor for getting a physical address corresponding to the virtual address by a hypercall;
      (14) determining the distribution of the buffer of the network interface card on each NUMA node on the basis of the analysis of the distribution of the buffer on the NUMA node corresponding to the physical address;
   wherein in the step (2), getting affinities of each NUMA node for the buffer of the network interface card on the basis of an affinity relationship between each NUMA node includes the following step:
      (21) getting the affinities of each NUMA node for the buffer of the network interface card according to information of distances between each NUMA node.

2. The scheduling method for virtual processors according to claim 1, wherein in the step (11), the size of the buffer of the virtual function is gotten by a network interface card performance testing tool.

3. The scheduling method for virtual processors according to claim 1, wherein the specified domain is Domain0 in the virtual machine monitor.

4. The scheduling method for virtual processors according to claim 1, wherein the virtual machine has a SR-IOV virtual function.

* * * * *